United States Patent Office 2,694,051
Patented Nov. 9, 1954

2,694,051

DERIVATIVES OF NOVOLAK RESINS AND METHODS OF PREPARING SAME

Donald M. Black, Melrose, Mass., assignor to Monsanto Chemical Company, St. Louis, Mo., a corporation of Delaware No Drawing. Application December 23, 1950,
Serial No. 202,575

3 Claims. (Cl. 260—29.3)

The present invention relates to the preparation of derivatives of novolak resins, and more particularly to the preparation of water-soluble sulfonic acid derivatives of novolak resins which are useful as synthetic tannin materials and are capable of tanning animal skins or pelts with or without the aid of other tanning agents, and to the derivatives so prepared.

It has been proposed heretofore to prepare synthetic tanning materials by first forming a novolak resin by condensing phenol and formaldehyde under acid conditions and then reacting the novolak resin with sulfuric acid at atmospheric or sub-atmospheric pressure. This process, which results in sulfonation of the benzene nucleus of the phenol, requires the use of a considerable amount of sulfuric acid or an equivalent sulfonating agent and is therefore not as efficient as is desired. Moreover, ring sulfonation is a rather drastic mode of sulfonation. Certain undesirable side reactions occur with the result that various bodies are produced in the sulfonation mixture which impart a reddish color to a pelt during the tanning process. This coloration of the leather is undesirable in the case of undyed leathers or leathers which are to be dyed with light colors. Further, this type of sulfonation does not provide an adequate procedure for controlling the molecular weight and solubility of the final product.

It has also been proposed heretofore to react novolak resins with sulfuric acid using acetic anhydride as a diluent. This process, which results in sulfonation of the benzene nucleus, also produces undesirable bodies in the sulfonation mixture through side reactions, and the resulting product, in general, has the same disadvantages as the products produced in accordance with the method described immediately above. Moreover, the process is too expensive to be useful on a commercial scale.

The novolak resins which are sulfonated in accordance with either of the foregoing prior art processes are prepared by reacting phenol and formaldehyde under acid conditions. The theory involved is that the phenol and formaldehyde first react to form a methylol phenol compound having the structure:

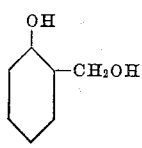

This compound then reacts with phenol to form a water-insoluble linear polymer of varying molecular weight having the structural unit:

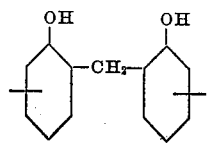

The first stage of the reaction to form the methylol compound is relatively slow compared to the condensation of the methylol compound with phenol or with the dimer, trimer, etc. Consequently there is little or no tendency to form cross-linked polymers. The resulting novolak resins are fusible and oil-soluble.

When the novolak resins are reacted with sulfuric acid or an equivalent sulfonating agent such as chlorosulfonic acid in water or an inert diluent, one or more sulfonic acid groups are introduced directly on the benzene ring to provide a linear polymer having the structural unit:

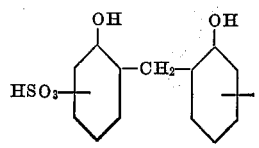

The number of sulfonic acid groups thus introduced depends primarily upon the molecular proportion of the sulfuric acid to phenol residues in the resin and the conditions under which the sulfonation is carried out.

In accordance with the present invention, it is possible to introduce sulfonic acid or sulfonate groups in novolak resins by a simple and direct process without directly sulfonating the aromatic rings of the novolak resins. The resulting product may be highly water-soluble or only slightly water-soluble under acid, neutral and alkaline conditions depending on the number of sulfonic acid or sulfonate groups introduced. Considerable control may be exercised over the reaction to provide resinous products of varying molecular weights and water-solubility. It is also possible in accordance with the present invention to produce synthetic tannins which may be used alone in the tanning of animal skins or pelts to provide a well filled leather which is light colored and resistant to water.

It is one object of this invention to provide simple and efficient processes for preparing new sulfonic acid derivatives of novolak resins.

It is a further object of this invention to provide novel tanning agents which may be used alone or together with other tanning agents.

It is a further object of this invention to provide a novel and efficient process for preparing water-soluble synthetic tanning agents from novolak resins without directly introducing sulfonic acid or sulfonate groups on the aromatic rings of the novolak resin.

It is a further object of this invention to provide a novel and efficient process for introducing sulfonic acid or sulfonate groups into novolak resins in such a manner that the aromatic rings of the novolak resin are not sulfonated directly and a tanning agent is obtained which is capable of tanning animal skins or pelts to provide a leather product which is substantially white in appearance.

Still further objects and advantages of this invention will appear in the following description and the appended claims.

These and other objects of the invention are attained, in general, by reacting a novolak resin with an alkali metal salt of sulfurous acid, for example, sodium sulfite and formaldehyde or paraformaldehyde in an alkaline aqueous medium for a period of time sufficient to introduce sulfonate groups into the novolak resin molecules. The solubility of the product in water under acid conditions depends on the number of sulfonic acid or sulfonate groups introduced into the novolak resin molecule, and the conditions under which the reaction is carried out. If the product is to be used as a tanning agent it is acidified before use.

Taking the basic structural unit of the novolak resin as

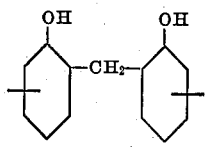

the reaction between the novolak resin, the formaldehyde and the alkali metal salt of sulfurous acid proceeds as follows:

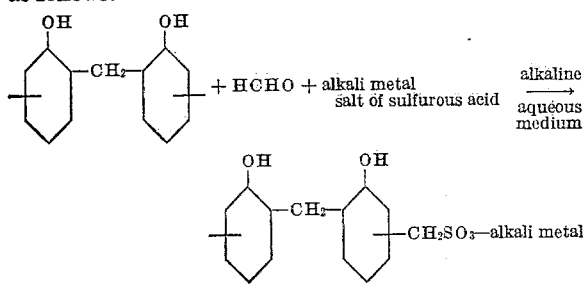

The product has a molecular weight at least equal to the novolak resin from which it is prepared. Since free formaldehyde is present at least during the initial stages of the reaction a certain amount of cross-linking of the novolak linear resin also takes place, that is, a certain amount of product having the following structure is also formed:

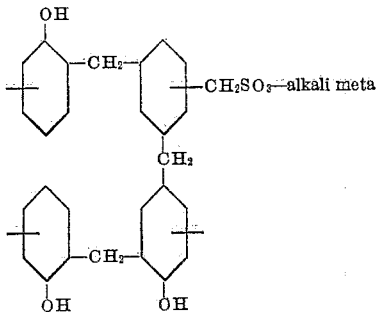

This product may be more highly cross-linked than is illustrated depending upon the amount of free formaldehyde available and the reaction conditions employed, and the number of —$CH_2$—$SO_3$— alkali metal groups may be less than or greater than the single group in the structure illustrated above. When the product is acidified the sulfonate groups are converted to sulfonic acid groups.

As examples of alkali metal salts of sulfurous acid which are useful in the processes of this invention may be mentioned sodium sulfite, potassium sulfite, sodium bisulfite, potassium bisulfite, sodium metabisulfite, potassium metabisulfite and the like. The alkali metal sulfites and bisulfites contain one mol of combined $SO_2$ for each mol of the sulfite. The alkali metal metabisulfites, on the other hand, contain 2 mols of combined $SO_2$ for each mol of the metabisulfite. Accordingly, only one-half molecular proportion of alkali metal metabisulfite is required to give an amount of combined $SO_2$ equivalent to the combined $SO_2$ in 1 molecular proportion of alkali metal sulfites or bisulfites. The preferred alkali metal salts of sulfurous acid, for the purposes of this invention, are sodium sulfite and sodium metabisulfite.

The term "novolak resin" as used herein is intended to cover the oil-soluble, fusible condensation products prepared by condensing hydroxy aromatic hydrocarbon compounds having from 6 to 10 carbon atoms and at least two reactive hydrogens on the aromatic ring and which contain no substituent groups other than hydroxyl and methyl groups, for example, compounds such as phenol, m- and p-cresol, xylenols and the like, and formaldehyde or a formaldehyde yielding compound such as paraformaldehyde in the presence of water and an acid catalyst. The preferred novolak resins are those which have a low molecular weight and are prepared by condensing from 1 to 1.2 mols of formaldehyde or formaldehyde yielding compound with 2 mols of the hydroxy aromatic hydrocarbon compound such as phenol, and particularly those resins in which the major portion of the resin has a molecular weight between about 600 and 1800. Such novolak resins are suitably prepared in accordance with processes disclosed in the prior art.

A preferred novolak resin for use in the processes of this invention is suitably prepared by reacting a mixture of 2 molecular proportions of phenol and 1 to 1.2 molecular proportions of formaldehyde in the form of formalin of 37% strength in the presence of from about 0.1 to 5% by weight, based on the phenol and formaldehyde, of an acid catalyst, preferably sulfuric acid. The reaction between the phenol and formaldehyde is exothermic and a considerable amount of heat is evolved so that heat need not be supplied at least until near the end of exothermic reaction. Near the end of the exothermic reaction the mass is heated under reflux to increase the macromolecular weight of the product. Best results have been obtained by first heating the phenol and the mineral acid catalyst to a temperature of about 90 to 95° C., after which the formalin is added at a rate sufficient to maintain the mass at 90 to 95° C. After all of the formalin has been added the mass is heated under reflux. The duration of the refluxing step is largely dependent on the nature and amount of acid catalyst used and the desired molecular weight of the novolak resin which is governed by the end use of the product after reaction with formaldehyde and the alkali metal salt of sulfurous acid. Satisfactory novolak resins for the purpose of this invention are obtained by refluxing the mass at a temperature of about 90 to 95° C. for a period of 2 to 6 hours.

The novolak resin is reacted with formaldehyde or paraformaldehyde and the alkali metal salts of sulfurous acid in an alkaline aqueous medium, in accordance with this invention, under a wide variety of reaction conditions depending on the end use of the product. Thus, the temperature of the aqueous medium in which the reaction is carried out may be varied considerably. The temperature need only be sufficient to bring about the introduction of sulfonate groups into the novolak resin. Generally, temperatures of about 30 to 100° C. may be used, although temperatures as high as 130° C. may be used when the reactants are heated under pressure in a pressure resistant vessel. Lower temperatures result in longer reaction times and, accordingly, in most instances it is preferred to use the higher temperatures. Temperatures of 70 to 100° C. are particularly preferred when it is desired to prepare synthetic tanning agents as the end products. At the temperatures indicated above, the reaction is usually complete within 2 to 8 hours with the lower time period corresponding to the higher temperatures.

The pH of the reaction mixture will vary considerably depending on the particular alkali metal salt of sulfurous acid used. Thus, with sodium sulfite the pH will be higher initially than in the case where sodium bisulfite of sodium metabisulfite is used. Moreover, since sodium hydroxide is liberated during the reaction when sodium sulfite is used and is not liberated in those instances when sodium bisulfite or sodium metabisulfite is employed, the reaction mixture at the completion of the reaction will have a higher pH when sodium sulfite is used. The alkalinity of the reaction mixture is normally derived from the alkali metal salt of the sulfurous acid and it is not necessary to add alkali for this purpose, especially when the amount of the alkali metal salt of sulfurous acid used is sufficient to neutralize the acidity of the novolak resin and the formalin solution. If the amount of the alkali metal salt of sulfurous acid employed is not sufficient for such neutralization a small amount of an alkali metal hydroxide is added to make the reaction mixture slightly alkaline.

The molecular proportions of formaldehyde, either as formalin or as paraformaldehyde, and the alkali metal salt of sulfurous acid may be varied widely with relation to each other and also with relation to the aromatic ring residues in the novolak resin, depending on the end use of the product. For most purposes, the mol ratio of formaldehyde to the alkali metal salt of sulfurous acid is preferably at least 1 mol of formaldehyde for each mol of combined $SO_2$ in the alkali metal salt. If less formaldehyde is used, an excess of the alkali metal salt of sulfurous acid remains in the reaction mixtures and does not take part in the reaction. Hence, the solids concentration of the reaction mixture is increased without any corresponding benefit. Moreover, if the reaction mixture is acidified at the end of the reaction, as is usually the case, more acid is required to neutralize the reaction mixture. Consequently, more salt is formed and the solids content of the final product is increased without any corresponding benefit in the properties of the end product. When it is desired to prepare synthetic tannin materials, the mol ratio of formaldehyde to combined $SO_2$ in the alkali metal salt of sulfurous acid should be at least 1:1, and preferably not more than 6:1. However, when it is desired to cross-link the novolak resin to the maximum possible extent, and a synthetic tannin is not desired, it is possible to increase the amount of formaldehyde without limit. In such a case, the mol ratio of formaldehyde to combined $SO_2$ in the alkali metal salt of sulfurous acid may be as high as 25:1.

The amount of the alkali metal salt of sulfurous acid used in relation to the aromatic ring residues in the novolak resin influences the water-solubility under acid conditions and the end use of the reaction product formed, it being understood, of course, that formaldehyde is also used with such salt as described above. Although strictly speaking the formaldehyde and alkali metal salt of sulfurous acid both influence the water-solubility of the final product under acid conditions, the alkali metal salt through introduction of sulfonate groups and the formaldehyde through the formation of methylol groups, the alkali metal salt of sulfurous acid exerts the primary solubilizing influence. The degree of solubility in water, of the final product under acid conditions, may be varied widely by proper selection of the proportions of the alkali metal salt of sulfurous acid with relation to the aromatic ring residues in the novolak. Thus, it is possible to use the sulfurous acid salt in an amount sufficient to provide from 2 to 0.5 mols of combined $SO_2$ for each aromatic ring residue (for example, phenol residue) in the novolak when products having high solubility in water under acid conditions are desired. These products are not particularly sensitive to salts and are valuable dispersing agents, but are generally not suitable for tanning purposes. By descreasing the proportion of the alkali metal salt of sulfurous acid with relation to the aromatic ring residues in the novolak resin, the water-solubility of the product under acid conditions decreases and its salt sensitivity increases, but the product becomes increasingly more useful as a synthetic tanning agent. Thus, if the sulfurous acid salt is used in amounts sufficient to provide from about 0.15 to 0.35 mol of combined $SO_2$ for each aromatic ring residue in the novolak resin, excellent tanning agents are obtained. These agents have sufficient water-solubility to be soluble in water which is acidic, neutral and alkaline. If the mol ratio of combined $SO_2$ in the sulfurous acid salt to aromatic ring residues in the novolak resin is appreciably below 0.1, the products are substantially insoluble in water under acid conditions. The formaldehyde which is used in conjunction with the alkali metal salt of sulfurous acid also effects the water solubility under acid conditions, the salt sensitivity and tanning properties of the final product, and these properties, including the molecular weight of the final resin, may be varied to some extent by proper selection of the formaldehyde to sulfurous acid salt ratio, as discussed previously, and by proper selection of the reaction conditions.

When products which are soluble in water under acid conditions are desired it is important to use sufficient water in the reaction mixture to dissolve all of the reagents and the final product, otherwise the reaction does not proceed as rapidly as is desired and various difficulties are encountered. When the final solution is to be shipped, it is usually desirable to use the minimum amount of water in the reaction mixture.

After the reaction of the novolak, the formaldehyde and the alkali metal salt of sulfurous acid has proceeded to the desired extent, an alkaline mixture or solution is obtained which may be used as such or neutralized with an acid or made acidic. If the solution is neutralized or made acidic, it is preferably cooled prior to the addition of acid to avoid high temperatures caused by the heat of neutralization of alkali in the mixture. In the preparation of synthetic tannins, the final solution is made acidic with a mineral acid, such as sulfuric acid, preferably together with an organic acid such as glycolic acid as a buffering agent. In such instances the final pH of the solution is preferably adjusted between about 3 and 4.7. When a minimum amount of water is used in the reaction mixture, the final solution is quite viscous. Such solutions may be diluted with water to increase their pourability either before or after they are neutralized.

A preferred process for preparing synthetic tanning agents in accordance with this invention is described below. A novolak resin prepared by condensing 1 to 1.2 molecular proportions of formaldehyde and 2 molecular proportions of a hydroxy aromatic hydrocarbon, as hereinbefore defined, in the presence of an acid catalyst, and in which a major portion of the resin has a molecular weight between 600 and 1800, is reacted in water with a sufficient amount of sodium bisulfite or sodium metabisulfite to provide from 0.15 to 0.35 molecular proportion of combined $SO_2$ and from 0.15 to 2.10 molecular proportions of formaldehyde, both based on one aromatic ring residue in the novolak resin. The smallest molecular proportion of formaldehyde corresponds to the smallest molecular proportion of sulfite and the highest molecular proportion of formaldehyde corresponds to the highest molecular proportion of the sulfite. The amount of water used should be sufficient to dissolve the formaldehyde-sulfite addition product which is formed and the final reaction product. The reaction mixture is heated at a temperature of 80 to 100° C. for a period of 360 minutes to 75 minutes, after which the reaction mixture is preferably cooled and is then acidified to a pH of about 3 to 4.7 with sulfuric or phosphoric acid and glycolic acid. The final solutions contain from about 20 to 55% solids of which about 25 to 55% is active tannin.

The final solution is especially suitable for tanning animal skins or pelts without the aid of other tanning agents and provides leather products which are full and plump and resistant to water. These leather products are substantially the same color as the animal skins or pelts from which they are prepared.

A further understanding of the processes and products of this invention will be obtained from the following specific examples which are intended to illustrate the invention, but are not intended to limit the scope thereof, percentages being by weight.

*Example I*

A novolak resin was first prepared by heating a mixture of 47.2 milliliters of 94% phenol, 18.8 milliliters of formalin of 37% strength and 1.0 milliliter of 0.5 N sulfuric acid to a temperature of 50° C. to initiate the reaction, after which the temperature was maintained at about 50° C. by cooling during the period of rapid heat evolution. This required about 30 minutes. The temperature of the mixture was then raised to about 95° C. and the mixture was held at that temperature for 4 hours under reflux. Seventy-five percent of the resin had a molecular weight between 800 and 1300.

Thirty-one and five tenths grams of anhydrous sodium sulfite, thirty-seven and five tenths milliliters of formalin (37% HCHO) and twenty milliliters of water were added to the novolak resin as prepared immediately above. The resulting mixture was alkaline. The whole reaction mixture was then heated to a temperature of about 95° C. for a period of 3 hours under reflux. During this period of heating the novolak resin became soluble in the alkaline aqueous medium and a viscous solution was obtained. After the 3 hour heating period, the solution was cooled and then acidified with 10 milliliters of technical glycolic acid and 4.1 milliliters of 98% $H_2SO_4$. The product had a pH between about 3 and 4 and contained 59.5% solids, 43% of which is active tannin.

*Example II*

A novolak resin was first prepared by heating a mixture of 56.5 milliliters of a commerical mixture of crude xylenols, 18.8 milliliters of formalin (37% HCHO) and 10 milliliters of 0.5 N $H_2SO_4$ to a temperature of 50° C. to initiate the reaction, after which the temperature was maintained at about 50° C. during the period of rapid heat evolution by cooling. This required about 20 minutes. The temperature of the mixture was then raised to about 95° C. and the mixture was held at that temperature for 4 hours under reflux. Seventy-five percent of the resin had a molecular weight between about 700 and 1200.

Thirty-five and six tenths grams of anhydrous sodium sulfite, thirty-seven and five tenths milliliters of formalin (37% HCHO) and fifty milliliters of water were added to mixture of novolak resin and water, prepared as described immediately above. The resulting mixture was alkaline. This reaction mixture was then heated to a temperature of 94 to 96° C. and held at this temperature for 95 minutes under reflux. During this period of heating the novolak resin became soluble in the reaction mixture and a viscous alkaline solution was obtained. The solution was cooled and then acidified with 13 milliliters of technical glycolic acid and 3.1 milliliters of 98% $H_2SO_4$. The product had a pH of between about 3 and 4 and contained 54.9% solids, 26% of which is active tannin.

Example III

A novolak resin was first prepared by heating a mixture of 94.3 milliliters of 94% phenol and 0.1 milliliter of 98% $H_2SO_4$ to a temperature of 94 to 96° C., after which heating was discontinued and 37.5 milliliters of formalin (37% HCHO) were added at a rate sufficient to maintain the temperature of the mixture between 94 and 96° C. After all of the formalin had been added the mixture was maintained at 94 to 96° C. by heating for a period of 2.5 hours. Seventy-five percent of the resin had a molecular weight between about 900 and 1400.

Sixty-three grams of anhydrous sodium sulfite, ninety-five and four tenths milliliters of formalin (37% HCHO) and two hundred and fifty milliliters of water were added to the above novolak-water mixture. The resulting mixture was alkaline. This mixture was heated to a temperature of 94 to 96° C. and was maintained at that temperature for a period of 2.5 hours. During this period of heating the novolak resin became soluble and a viscous alkaline solution was obtained. This solution was acidified with 25.0 milliliters of technical glycolic acid and 10.0 milliliters of 98% $H_2SO_4$. The product had a pH between about 3 and 4 and contained 37.8 solids, 38% of which is active tannin.

Example IV

A novolak resin was prepared in accordance with the procedure described in the first paragraph of Example I using 94.3 milliliters of 94% phenol, 37.5 milliliters of formalin (37% HCHO) and 10 milliliters of 0.5 N $H_2SO_4$, except that the mixture was held at 94 to 96° C. for 2.5 hours instead of 4 hours.

Forty-seven and two tenths grams of anhydrous sodium sulfite, eigthy-three milliliters of formalin (37% HCHO) water were added to the above novolak resin-water mixture. The resulting mixture was alkaline. This mixture was heated to a temperature of 94 to 96° C. and held at that temperature for 5 hours and 10 minutes. During this heating period the novolak resin dissolved and a viscous alkaline solution was formed. This solution was acidified with 13.0 milliliters of technical glycolic acid and 7.0 milliliters of 98% $H_2SO_4$. The product had a pH between about 3 and 4 and contained 48.6% solids, 39% of which is active tannin.

The resin solutions prepared in accordance with the foregoing examples contained a resinous material having a higher molecular weight than the starting novolak resin, and this resinous material contained sulfonate groups which were attached to a methylene radical which was in turn attached to the phenol residues in the resin. The resin solutions prepared as described in the foregoing examples were used to tan sheepskin without the aid of other tanning agents and provided a full, plump leather product which was substantially white in appearance and resistant to water.

Various modifications and changes may be made in the processes and products described herein as will be apparent to those skilled in the art to which this invention appertains without departing from the spirit and intent of the present invention. It is accordingly intended that this invention shall be limited only by the scope of the appended claims.

What is claimed is:

1. A process of preparing improved synthetic tannins which consists in reacting (1) a novolak resin of 2 molecular proportions of phenol and 1 to 1.2 molecular proportions of formaldehyde, in which novolak resin the major portion of the resin has a molecular weight between about 600 and 1800, (2) sodium metabisulfite in an amount sufficient to provide from 0.15 to 0.35 molecular proportions of combined $SO_2$ for each phenol residue in said novolak resin and (3) from 0.15 to 2.10 molecular proportions of formaldehyde based on each phenol residue in said novolak resin, the smallest molecular proportion of formaldehyde corresponding to the smallest molecular proportion of said metabisulfite and the highest molecular proportion of formaldehyde corresponding to the highest molecular proportion of said metabisulfite, in an alkaline aqueous medium at a temperature of 80 to 100° C. for a period of 360 minutes to 75 minutes to provide a resin solution in which the resin is soluble under acid conditions, cooling said resin solution and then acidifying said solution to a pH of 3 to 4.7 with glycolic acid and an acid selected from the group consisting of sulfuric and phosphoric acid.

2. A process of preparing improved synthetic tannins which consists in reacting (1) a novolak resin of 2 molecular proportions of mixed xylenols and 1 to 1.2 molecular proportions of formaldehyde, in which novolak resin the major portion of the resin has a molecular weight between about 600 and 1800, (2) sodium metabisulfite in an amount sufficient to provide from 0.15 to 0.35 molecular proportion of combined $SO_2$ for each xylenol residue in said novolak resin and (3) from 0.15 to 2.10 molecular proportions of formaldehyde based on each xylenol residue in said novolak resin, the smallest molecular proportion of formaldehyde corresponding to the smallest molecular proportion of said metabisulfite and the highest molecular proportion of formaldehyde corresponding to the highest molecular proportion of said metabisulfite, in an alkaline aqueous medium at a temperature of 80 to 100° C. for a period of 360 minutes to 75 minutes to provide a resin solution in which the resin is soluble under acid conditions, cooling said resin solution and then acidifying said solution to a pH of 3 to 4.7 with glycolic acid and an acid selected from the group consisting of sulfuric and phosphoric acid.

3. A process of preparing improved synthetic tannins which consists in reacting (1) a novolak resin of 2 molecular proportions of a mono-hydroxy aromatic hydromatic compound having from 6 to 10 carbon atoms and at least 2 reactive hydrogen atoms on the aromatic ring and which contains no substituent groups other than hydroxyl and methyl groups and 1 to 1.2 molecular proportions of formaldehyde, in which novolak resin the major portion of the resin has a molecular weight between about 600 and 1800, (2) a substance selected from the group consisting of sodium bisulfite and sodium metabisulfite in an amount sufficient to provide from 0.15 to 0.35 molecular proportion of combined $SO_2$ for each aromatic ring in said novolak resin and (3) from 0.15 to 2.10 molecular proportions of formaldehyde based on each aromatic ring in said novolak resin, the smallest molecular proportion of formaldehyde corresponding to the smallest molecular proportion of said substance and the highest molecular proportion of formaldehyde corresponding to the highest molecular proportion of said substance, in an alkaline aqueous medium at a temperature of 80 to 100° C. for a period of 360 minutes to 75 minutes to provide a resin solution in which the resin is soluble under acid conditions, cooling said resin solution and then acidifying said solution to a pH of 3 to 4.7 with glycolic acid and an acid selected from the group consisting of sulfuric and phosphoric acid.

References Cited in the file of this patent

UNITED STATES PATENTS

| Number | Name | Date |
|---|---|---|
| 2,171,963 | Koch | Sept. 5, 1939 |
| 2,177,420 | Noerr | Oct. 24, 1939 |
| 2,320,678 | Tassel | June 1, 1943 |
| 2,592,587 | Nagy | Apr. 15, 1952 |

OTHER REFERENCES

Carswell, Phenoplasts, pages 29–35 (1947), Interscience Publishers, Incorporated.